(12) United States Patent
Kumar et al.

(10) Patent No.: US 9,236,791 B2
(45) Date of Patent: Jan. 12, 2016

(54) SYSTEMS AND METHODS FOR DISTRIBUTING POWER IN A VEHICLE

(71) Applicant: General Electric Company, Schenectady, NY (US)

(72) Inventors: Ajith Kuttannair Kumar, Erie, PA (US); Wendong Zhang, Erie, PA (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 13/644,609

(22) Filed: Oct. 4, 2012

(65) Prior Publication Data

US 2014/0097696 A1    Apr. 10, 2014

(51) Int. Cl.
| | |
|---|---|
| *H02M 1/12* | (2006.01) |
| *H02M 7/5387* | (2007.01) |
| *H02M 7/493* | (2007.01) |
| *B60L 1/12* | (2006.01) |
| *B60L 1/16* | (2006.01) |
| *B60L 9/22* | (2006.01) |
| *B60L 11/10* | (2006.01) |
| *B60L 11/18* | (2006.01) |
| *B60L 15/00* | (2006.01) |

(52) U.S. Cl.
CPC ................. *H02M 1/126* (2013.01); *B60L 1/12* (2013.01); *B60L 1/16* (2013.01); *B60L 9/22* (2013.01); *B60L 11/10* (2013.01); *B60L 11/1842* (2013.01); *B60L 11/1844* (2013.01); *B60L 11/1846* (2013.01); *B60L 15/007* (2013.01); *H02M 7/493* (2013.01); *H02M 7/5387* (2013.01); *B60L 2200/26* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2260/28* (2013.01); *Y10T 307/707* (2015.04)

(58) Field of Classification Search
CPC .......... H02M 1/12; H02M 1/126; H04Q 3/00; H02J 5/00
USPC ....................... 307/83, 104; 320/63
See application file for complete search history.

(56) References Cited

U.S. PATENT DOCUMENTS

2010/0140061 A1* 6/2010 Gibbs et al. ................ 200/50.32
2011/0315043 A1  12/2011 Kumar

* cited by examiner

*Primary Examiner* — Jared Fureman
*Assistant Examiner* — Rafael Pacheco
(74) *Attorney, Agent, or Firm* — GE Global Patent Operation; John A. Kramer

(57) ABSTRACT

Various systems and method for distributing electrical power are provided. In one embodiment, a system includes a first inverter coupled to an electrical bus, a second inverter coupled to the electrical bus, a filter including a first inductor and a second inductor, and a transfer switch circuit coupled between the first inverter and the second inverter and a load. The transfer switch circuit is configured to transfer power from the first inverter through the first inductor to the load and transfer power from the second inverter through the second inductor to the load in a first mode of operation. The transfer switch circuit is further configured to transfer power from the first inverter through the first inductor and through the second inductor to the load in a second mode of operation.

20 Claims, 7 Drawing Sheets

SYSTEMS AND METHODS FOR DISTRIBUTING POWER IN A VEHICLE

FIELD

Embodiments of the subject matter disclosed herein relate to systems and methods for distributing electrical power from an inverter circuit in a vehicle.

BACKGROUND

In some vehicles, an engine may be coupled to an alternator to generate electrical power for various components. For example, a locomotive or a generator car may include a head-end-power or hotel-electric-power (HEP) alternator that distributes electrical power to other cars in a train for lighting, electrical, and other hotel needs of passengers. More particularly, the HEP alternator may provide electrical power through a bus to an inverter circuit. For example, the inverter circuit may include dual inverters that convert direct current (DC) power from the bus to alternating current (AC) power that is provided to other cars and various electrical components.

In one example, the dual inverter circuit may be controlled by a three-position transfer switch circuit that enables the dual inverters to operate in parallel, or each in standalone operation depending on operating conditions. FIGS. 11-12 show a PRIOR ART transfer switch circuit 1100 in different operating positions. FIG. 11 shows the transfer switch circuit 1100 in a parallel operating position (e.g., middle position) where power is provided from each of a first inverter 1102 and a second inverter 1108 to a load 1114. In particular, the first inverter 1102 provides power through a first contact 1104 and through a first inductor 1106 to the load 1114. Further, the second inverter 1108 provides power through a second contact 1110 and through a second inductor 1112 to the load 1114.

FIG. 12 shows the transfer switch circuit 1100 in a standalone operating position (e.g., top position) where power is provided from the first inverter 1102 to the load 1114. In this position, the second inverter 1108 does not provide power to the load 1114. In particular, the first inverter 1102 provides power through a third contact 1116 and through the first inductor 1106 to the load 1114.

In some cases, a power transfer capability of the transfer switch circuit 1100 may be restricted due to the layout of the transfer switch. For example, when the transfer switch circuit 1100 is in the standalone operating position, all of the power from the first inverter (and the bus) passes through the third contact 1116 and first inductor 1106. In other words, the power transfer circuit 1100 provides no current sharing capabilities between contacts while in the standalone operating position. Moreover, the power transfer circuit 1100 provides no current sharing capabilities between inductors while in the standalone operating position. Because of such power demands on the single contact of the transfer switch and the single inductor while in the standalone operation position, power transferred through the switch to the load may be restricted in order to reduce the likelihood of degradation of that contact and the inductor.

BRIEF DESCRIPTION OF THE INVENTION

In one embodiment, a system includes a first inverter coupled to an electrical bus, a second inverter coupled to the electrical bus, a filter including a first inductor and a second inductor, and a transfer switch circuit coupled between the first inverter and the second inverter and a load. The transfer switch circuit is configured to transfer power from the first inverter through the first inductor to the load and transfer power from the second inverter through the second inductor to the load in a first mode of operation. The transfer switch circuit is further configured to transfer power from the first inverter through the first inductor and through the second inductor to the load in a second mode of operation.

The system, and more particularly, the transfer switch circuit, provides even power sharing among inductors throughout multiple modes of operation, such that no one inductor receives enough current to cause degradation. In particular, in the standalone mode of operation where power from one inverter is provided to the load, power from the inverter is divided evenly between the two inductors. In this way, the power transfer capability of the transfer switch circuit can be increased relative to the transfer switch circuit 1100 where all power from an inverter flows through a single inductor when operating in the standalone position.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to various embodiments of systems and methods for distributing electrical power in a vehicle. More particularly, the present description relates to a transfer switch circuit that is configured to transfer power from a dual inverter circuit to a load. The transfer switch circuit operates in different modes (or positions) of operation where power paths are evenly shared between different inductors and/or different switch contacts in each of the modes of operation.

In one example, a train may include a plurality of rail vehicles interconnected with one another. In some examples, one rail vehicle may generate electrical power and transmit the electrical power to other rail vehicles in the train. Such power may be generated in a head-end-power or hotel-electric-power (HEP) system. The HEP system may provide power to a HEP bus. The dual inverter circuit may be coupled to the HEP bus to modify the power on the HEP bus to a suitable form to be distributed to the plurality of rail vehicles (e.g., converter direct current (DC) power to alternating current (AC) power) that may be referred to in some cases as a load on the HEP bus. Further, the transfer switch circuit may be coupled between the dual inverter circuit and the load to control power transfer from the HEP bus to the load.

Figure 1:
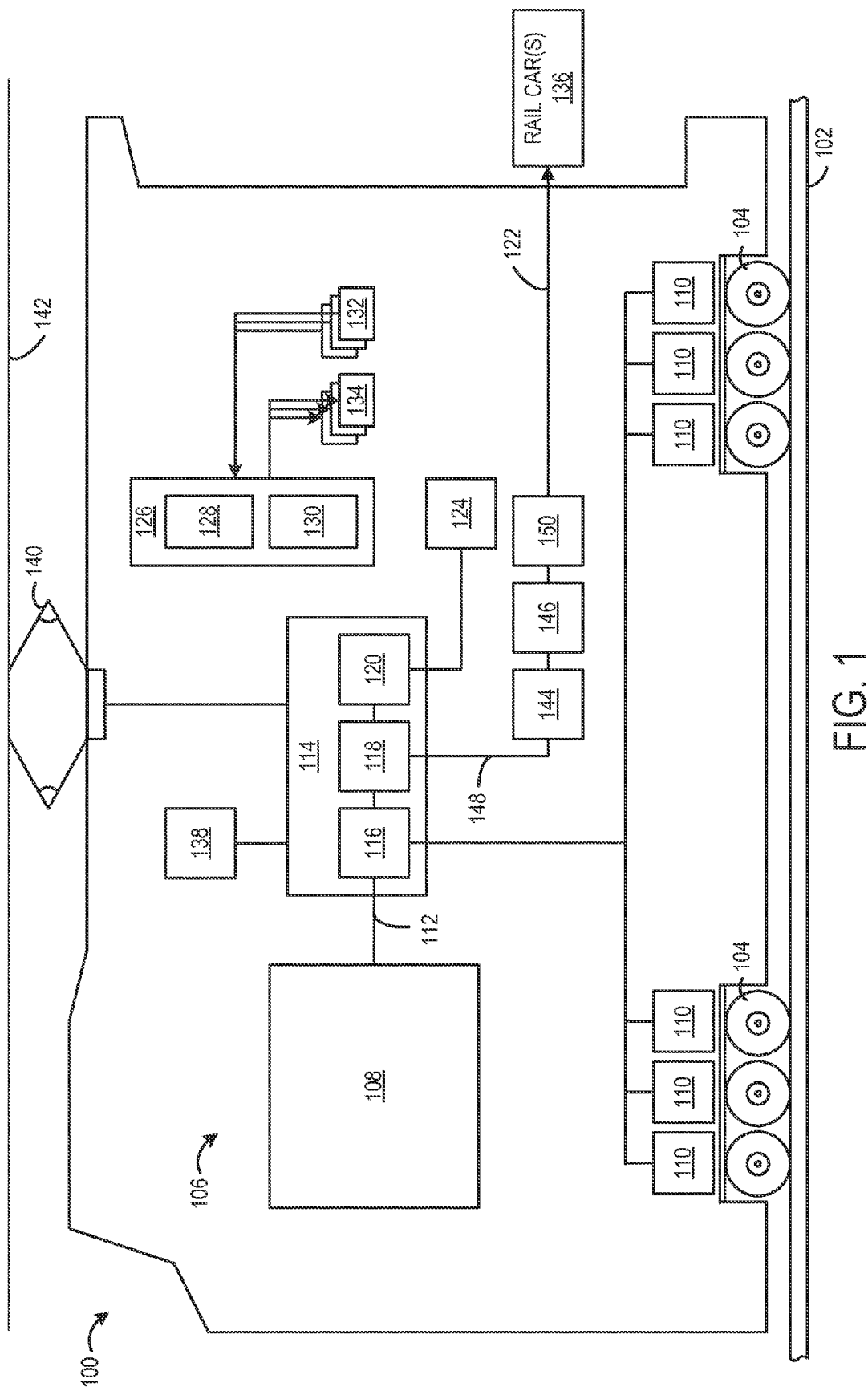
FIG. 1 shows a schematic diagram of a rail vehicle according to an embodiment of the present disclosure.

FIG. 1 schematically shows an embodiment of a vehicle system 100, herein depicted as a rail vehicle, configured to run on a rail 102 using a plurality of wheels 104. In one example, the rail vehicle 100 is a locomotive. In another example, the rail vehicle 100 is a generator car that is not a locomotive. In some embodiments, the vehicle system 100 may be coupled to a plurality of rail cars 136 that are connected to form a train. In one example, the train is a passenger train that includes one or more locomotives coupled to one or more passenger cars. The rail vehicle 100 includes an engine system 106. In other non-limiting embodiments, the engine system 106 is a stationary engine system, such as in a power-plant application, while in yet other applications, the engine is used in a ship, on-highway vehicle, off-highway vehicle, or other propulsion system. The engine system 106 is operable to generate electrical power for distribution to various components, modules, cars, etc. that may be remotely located from the engine system 106.

In one example, the rail vehicle 100 is a diesel-electric vehicle. For example, the engine system 106 includes a diesel engine 108 that generates a torque output on a drive shaft 112 that is transmitted to an electrical power generation unit 114. In some embodiments, the engine 108 is a four-stroke engine in which each of the cylinders fires in a firing order during two revolutions of the drive shaft 112. In other embodiments, the engine 108 is a two-stroke engine in which each of the cylinders fires in a firing order during one revolution of the drive shaft 112.

The electrical power generation unit 114 produces electrical power that is applied for subsequent propagation to a variety of downstream electrical components. The electrical power generation unit 114 includes a traction alternator 116, a HEP alternator 118, and an auxiliary alternator 120. As described herein, the alternators of the electrical power generation unit 114 may also be referred to individually as power distribution units, power systems, or power circuits. Each of the traction alternator 116, the HEP alternator 118, and the auxiliary alternator 120 are coupled to the drive shaft 112 to convert torque output from the engine 108 into electrical power to be distributed to various components.

In the illustrated embodiment, the traction alternator 116, the HEP alternator 118, and the auxiliary alternator 120 are positioned in the same physical housing of the electrical power generation unit 114. However, it will be appreciated that in some embodiments, one or more of the alternators may be located elsewhere in the rail vehicle. For example, in some embodiments, the engine system of the rail vehicle may include a second engine and one or more of the alternators may be coupled to a drive shaft of the second engine.

The traction alternator 116 provides electrical power to a plurality of traction motors 110. As depicted, the plurality of traction motors 110 are each connected to one of a plurality of wheels 104 to provide tractive power to propel the rail vehicle 100. One example rail vehicle configuration includes one traction motor per wheel pair (axle). As depicted herein, six traction motors correspond to each of six pairs of wheels of the rail vehicle. The traction alternator 116 and associated electronic components will be discussed in further detail below with reference to FIG. 2.

The HEP alternator 118 provides electrical power to a plurality of rail cars 136 coupled to the rail vehicle 100 through a contactor 122. In one example, the plurality of rail cars includes unpowered cars, such as passenger cars, dining cars, etc. For example, electrical power provided by the HEP alternator 118 may supply the lighting, HVAC, dining car kitchen, battery charging loads, and other hotel needs of connected rail cars. In another example, the unpowered cars use the electrical power provided by the HEP alternator for heating, lighting, ventilation, air conditioning, communication equipment, entertainment devices, fans, outlets/sockets, or kitchen equipment. As used herein, a HEP alternator refers to an alternator that generates electrical power in a first rail vehicle that is transmitted to, and consumed by, electrical loads positioned in other rail vehicles that are mechanically coupled to, either directly or indirectly, the first rail vehicle in a train.

In some embodiments, the vehicle system is one of a plurality of vehicles coupled together and the HEP alternator provides power to some or all of the plurality of coupled vehicles. In one example, the vehicle system is a one of a plurality of locomotives or other rail vehicles in a consist. (A consist is a group of vehicles that are mechanically coupled to travel together along a route.) As another example, the vehicle system is one generator car in a set of generator cars across one or more locomotives in a consist. In such embodiments, a HEP load may be balanced between the plurality of vehicles. In one example, the HEP load is balanced between the plurality of vehicles to maintain a designated horse power and/or a fuel consumption rate. In one example, the HEP load may be in a range from about 20 kW to more than 150 kW, or up to 560 kW. In other examples, the HEP load may have a voltage range from 800 V to 1000 V AC/DC two pole (400 or 600 A), 1500 V AC two pole (800 A) or at 415 V three-phase, 380 V three-phase, three-phase AC at 480 V, or switchable between voltages: e.g., 1,000 V AC 16⅔ Hz, 1,500 V AC 50 Hz, 1,500 V DC and 3,000 V DC. In one particular example, the HEP alternator supplies three-phase AC electrical power at 480 V and 60 Hz. In some embodiments, transformers may be fitted in each rail car to lower voltages for consumption by various onboard devices.

The HEP system 118 provides power to various electrical components through a HEP bus 148. For example, the HEP alternator may produce AC power that is converted to DC power by a rectifier and supplied to the HEP bus 148. A dual inverter circuit 144 is coupled to the HEP bus 148. The dual inverter circuit 144 includes two inverters configured to modify the electrical power received from the HEP bus 148 to a suitable form to be provided to the rail cars 136 of the rail vehicle 100. In particular, the dual inverter circuit 144 converts DC power to AC power, among other modifications. It will be appreciated that other inverter circuits having a different amount of inverters may be employed without departing from the scope of the present disclosure.

A transfer switch circuit 146 is positioned between the dual inverter circuit and the HEP load (e.g., rail cars) to control the supply of current to the HEP load. The transfer switch circuit 146 may be operable in three different modes of operation depending on operating conditions. Specifically, the transfer switch circuit is operable in a first mode of operation that enables a first inverter and a second inverter to operate in parallel, a second mode of operation that enables standalone operation of the first inverter, and a third mode of operation that enables standalone operation of the second inverter. The transfer switch circuit is configured such that power is shared equally between active switch contacts in each of the modes of operation. The transfer switch circuit will be described in further detail with reference to FIGS. 4-6.

A HEP filter 150 is coupled to the HEP transfer switch circuit 146. The HEP filter 150 reduces current that does not have a predetermined frequency or a frequency that falls outside a predetermined range of frequencies. For example, inductors are used to limit current slew rate and provide filtering with capacitors to the load. In one example, the HEP filter includes a first inductor, a second inductor, a first capacitor, and a second capacitor. The inductors and capacitors form LC circuits that tune a frequency of the power output by the dual inverter circuit 144. The AC power output from the HEP filter 150 is distributed to the rail cars 136 through the contactor 122. It will be appreciated that additional inverters, filters, and/or other electric loads may be joined to the HEP bus to draw current from the HEP bus and may be considered as part of the HEP load. For example, the additional electric loads may be fans, blowers, compressors, electronic devices, and the like.

The auxiliary alternator 120 provides electrical power to one or more auxiliary components 124 of the engine system 106. For example, an auxiliary component may include a radiator fan, an alternator blower, an inverter blower, a resistive grid blower, a cooling tower blower, or another component associated with operation of the engine system 106.

In some embodiments, an energy storage system 138 may be coupled to the electrical power generation unit 114. The energy storage system 138 may be operable to receive power from any of the alternators in the electrical power generation unit and provide power to any of the power distribution systems associated with the alternators. In one example, the energy storage system 138 may be operable to receive power from the HEP alternator 118 when available, and provide power to an electrical component coupled to the HEP alternator when the HEP alternator does not provide power to the electrical component. In one example, the HEP alternator may not provide power to the electrical component because the power may be provided to traction motors or may be used elsewhere. For example, the electrical component may include one or more of the plurality of cars coupled to the HEP alternator, or an auxiliary blower or other component coupled to a HEP bus. It will be appreciated that energy storage system 138 may include a battery and/or another suitable power storage device.

In some embodiments, the traction motors 110 may have regenerative power producing capabilities, such as power produced during regenerative braking operations. As such, the vehicle system 100 may be configured to feed power produced during regenerative operation to the HEP system, under some conditions. In particular, regenerative power may be provided to the HEP bus to meet a HEP load.

In some embodiments, the vehicle system 100 includes a pantograph 140 that is coupled to an overhead power line 142. The pantograph 140 collects power from the overhead power line 142 when available to be used for various operations. The pantograph 140 is coupled to the power generation unit 114 to provide power to the various power systems including the HEP system. In one example, the pantograph 140 is operable to provide power to a hotel load on a HEP bus when available. Further the HEP alternator is operable to provide power to the hotel load when the pantograph does not provide power to the hotel load.

A controller 126 at least partially controls operation of the rail vehicle 100 and the engine system 106. The controller 126 includes a microprocessor unit (e.g., a processor) 128 and an electronic storage medium (a.k.a., a computer-readable storage medium) 130. For example, the computer-readable storage medium includes one or more of a read-only memory chip, random access memory, etc. The computer readable storage medium 130 holds instructions that when executed by the microprocessor unit 128 executes programs for controlling operation of the engine system 106 as well as methods discussed in further detail below with reference to FIG. 9. The controller 126, while overseeing control and management of the vehicle system 100, is configured to receive signals from a variety of engine sensors 132 in order to determine operating parameters and operating conditions, and correspondingly adjust various actuators 134 to control operation of the rail vehicle 100.

In one example, the controller 126 may control operation of the transfer switch circuit 146 into different modes of operation where power transferred through the transfer switch circuit is shared equally between inductors of the HEP filter 150 in each of the modes of operation. In particular, the controller 126 is configured to operate that transfer switch circuit 146 in a first mode of operation, where the transfer switch circuit 146 is configured to transfer power from the first inverter of the dual inverter circuit 144 through the transfer switch circuit 146 and through a first inductor of the HEP filter 150 to the HEP load and transfer power from the second inverter of the dual inverter circuit 144 through the transfer switch circuit 146 and through a second inductor of the HEP filter 150 to the HEP load.

Further, the controller 126 is configured to operate the transfer switch circuit 146 in a second mode of operation, where the transfer switch circuit 146 is configured to divide power from the first inverter of the dual inverter circuit 144 between the first inductor and the second inductor of the HEP filter 150 to the load in parallel and transfer substantially no power from the second inverter to the HEP load.

Further still, the controller 126 is configured to operate the transfer switch circuit 146 in a third mode of operation, where the transfer switch circuit 146 is configured to divide power from the second inverter of the dual inverter circuit 144 between the first inductor and the second inductor of the HEP filter 150 to the load in parallel and transfer substantially no power from the first inverter to the HEP load.

The controller 126 may control the transfer switch circuit to switch modes of operation based on operating conditions. In one example, the controller 126 adjusts the transfer switch circuit from operating in the first mode to the second or third mode based on the HEP load. Further, the controller 126 may switch between the second and third modes of operation to maintain even wear and/or heating of the first and second inverters of the dual inverter circuit 144. In another example, the controller 126 adjusts the transfer switch circuit between the first mode and the second or third mode based on an output of the HEP alternator 118.

In another example, the controller 126 may control operation of the transfer switch circuit 146 into different modes of operation where power transferred through the transfer switch circuit is shared equally between active switch contacts in each of the modes of operation. In particular, the controller 126 is configured to operate the transfer switch circuit 146 in a first mode of operation, where the transfer switch circuit 146 is configured to transfer power from the first inverter of the dual inverter circuit 144 through a first contact of the transfer switch circuit 146 to the HEP load and transfer power from the second inverter of the dual inverter circuit 144 through a second contact of the transfer switch circuit 146 to the HEP load.

Further, the controller 126 is configured to operate the transfer switch circuit 146 in a second mode of operation, where the transfer switch circuit 146 is configured to divide power from the first inverter of the dual inverter circuit 144 between a third contact and a fourth contact to the load in parallel and transfer substantially no power from the second inverter to the HEP load.

Further still, the controller 126 is configured to operate the transfer switch circuit 146 in a third mode of operation, where the transfer switch circuit 146 is configured to divide power from the second inverter of the dual inverter circuit 144 between the second contact and a fifth contact to the load in parallel and transfer substantially no power from the first inverter to the HEP load.

Figure 2:
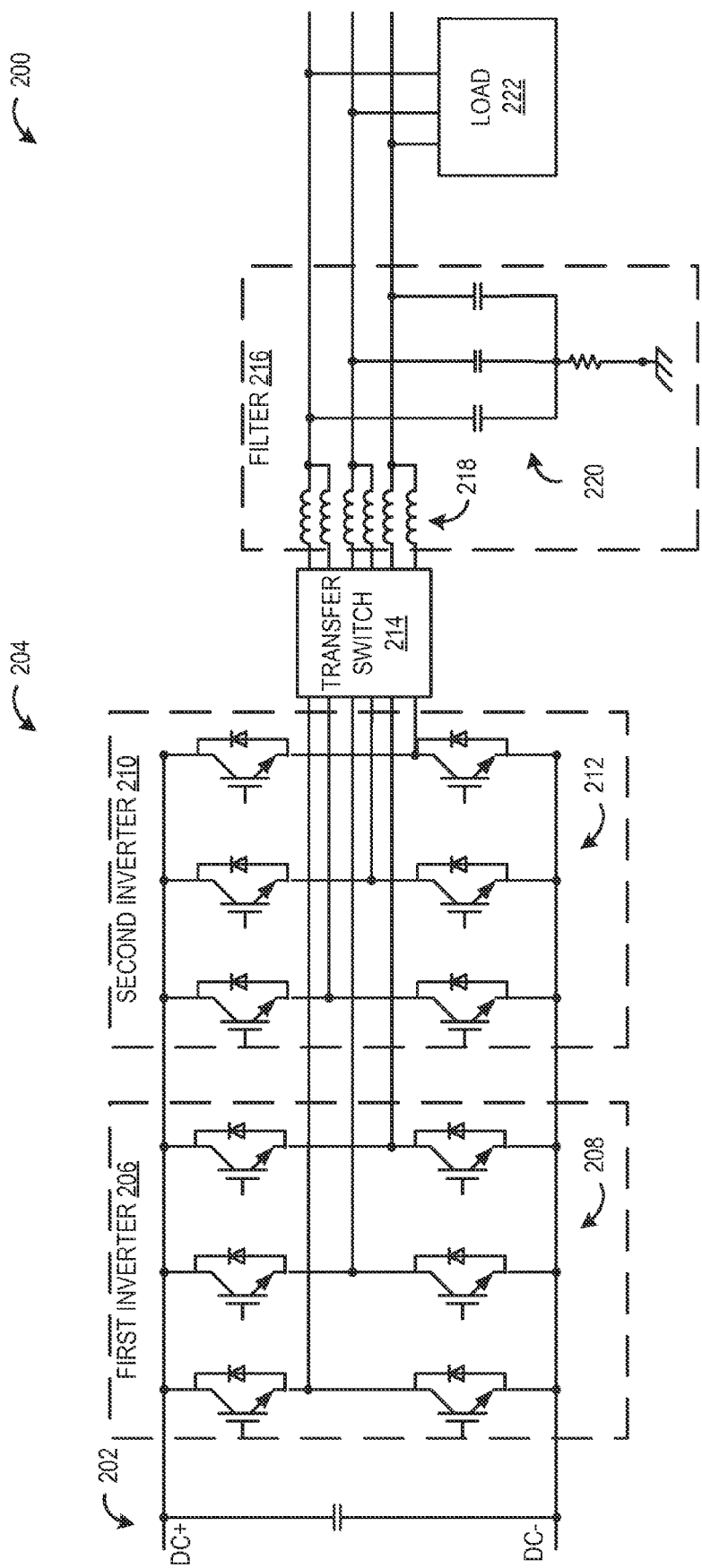
FIG. 2 shows a schematic diagram of a power distribution circuit according to an embodiment of the present disclosure.

FIG. 2 shows a schematic diagram of a power distribution circuit 200 according to an embodiment of the present disclosure. In one example, the power distribution circuit 200 may be implemented in as part of the HEP system 118 shown in FIG. 1 to distribute power to a HEP load that may include one or more rail cars of a train, for example. The power distribution circuit 200 includes a dual inverter circuit 204 coupled to a power bus 202. In the illustrated embodiment, the power bus 202 is a DC bus, and the dual inverter circuit 204 converts DC power from the power bus 202 to AC power to be distributed to a load 222. The dual inverter circuit 204 includes a first inverter 206 and a second inverter 210 connected in parallel to the power bus 202. The parallel configuration allows for a higher current rating relative to a single inverter. For example, the dual inverter circuit 204 is one non-limiting example of the dual inverter circuit 144 shown in FIG. 1.

In the illustrated embodiment, the first inverter 206 includes a plurality of transistors 208 that are arranged as three single-phase inverter switches each connected to one of three output terminals. The operation of the three switches is coordinated so that one switch operates at each 60 degree point of the fundamental output waveform to provide three-phase AC output. Likewise, the second inverter 210 includes a plurality of transistors 212 that are arranged as three single-phase inverter switches each connected to one of three output terminals. The operation of the three switches is coordinated so that one switch operates at each 60 degree point of the fundamental output waveform to provide three-phase AC output. In one example, the output waveform of the dual inverter circuit 204 is phase shifted to obtain a 12-step waveform when operating in parallel. It will be appreciated that other suitable inverter circuit configurations may be implemented without departing from the scope of the present disclosure.

A transfer switch circuit 214 is coupled to an output of the dual inverter circuit 204. The transfer switch circuit 214 is configured to operate in three different modes of operation based on operating conditions, such as HEP alternator output, HEP load, component temperature, etc. In particular, the transfer switch circuit 214 enables the circuit topology of the dual inverter circuit 204 to operate the first and second inverters 206 and 210 in parallel, during a first mode of operation; operate the first inverter 206 in standalone operation, during a second mode of operation; and operate the second inverter 210 in standalone operation, during a third mode of operation. Standalone operation means that one inverter provides power to an output of the transfer switch circuit and the other inverter does not provide power to an output of the transfer switch circuit. For example, the transfer switch circuit 214 is one non-limiting example of the transfer switch circuit 146 shown in FIG. 1.

A filter 216 is coupled to an output of the transfer switch circuit 214. The filter 216 is configured to attenuate high voltages above a designated level while limiting a slew rate of the output. In particular, the filter 216 includes a plurality of inductors 218 coupled between the transfer switch circuit 214 and the load 222. The plurality of inductors 218 block high-frequency signals and conduct low-frequency signals. Further, the filter 216 includes a plurality of capacitors 220 coupled between the plurality of inductors 218 and the load 222 to provide a path to ground. The plurality of capacitors 220 block low-frequency signals and conduct high-frequency signals. The filter 216 may be configured to output a designated power level that is tuned based on the load 222. For example, the filter 216 is one non-limiting example of the filter 150 shown in FIG. 1.

Figure 3:
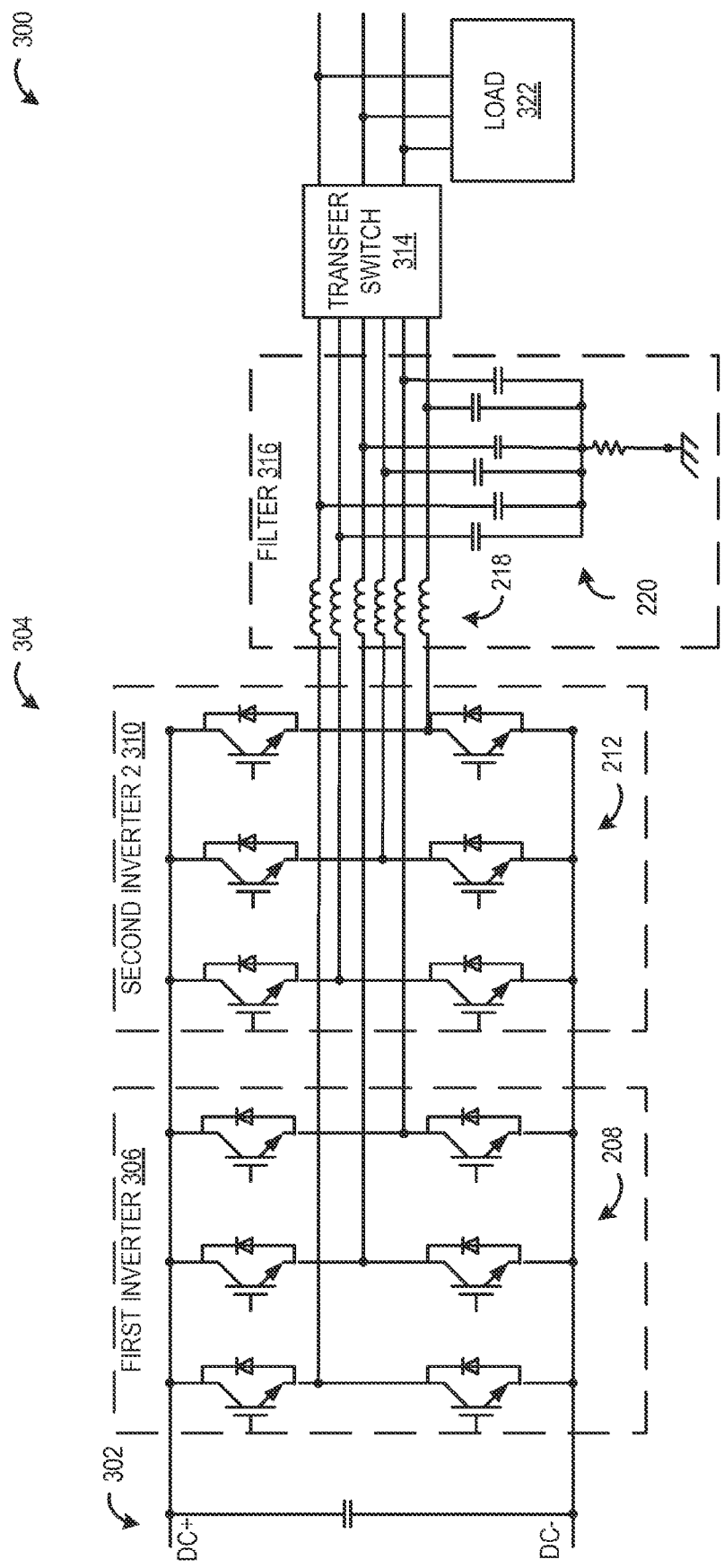
FIG. 3 shows a schematic diagram of another power distribution circuit according to an embodiment of the present disclosure.

FIG. 3 shows a schematic diagram of a power distribution circuit 300 according to another embodiment of the present disclosure. Components of the power distribution circuit 200 that may be substantially the same as those of the power distribution circuit 300 are identified in the same way and are described no further. However, it will be noted that components identified in the same way in different embodiments of the present disclosure may be at least partly different. The power distribution circuit 300 may be functionally equivalent to the power distribution circuit 200. However, in the power distribution circuit 300, the filter 316 is coupled between an output of the dual inverter circuit 304 and an input of the transfer switch circuit 314, and the transfer switch circuit 314 is coupled between the filter 316 and the load 322. In the illustrated embodiment, power from the dual inverter circuit 304 is tuned or attenuated by the filter 316 before the power flows to the transfer switch circuit 314.

Figure 4:
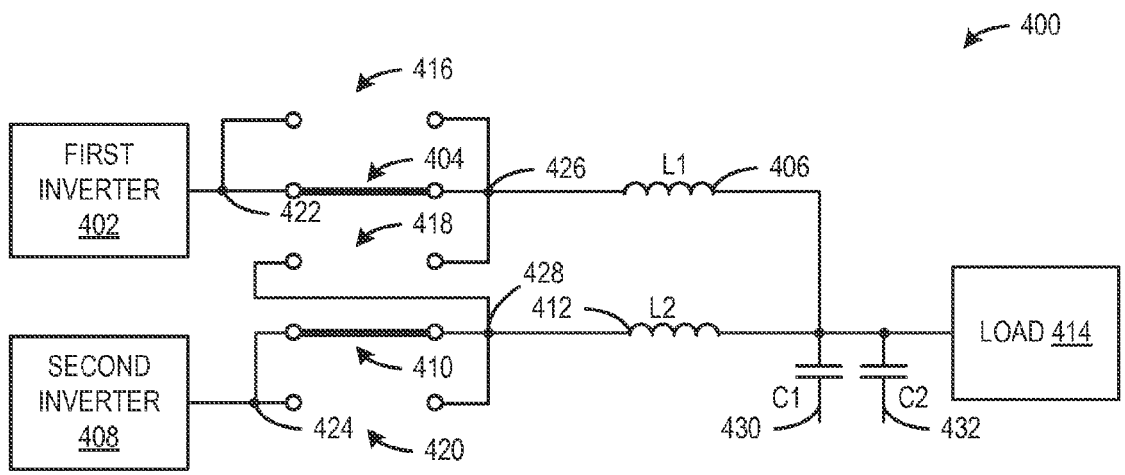
FIG. 4 shows a schematic diagram of transfer switch circuit operating in a first mode where two inverters provide power through the transfer switch circuit to a load in parallel operation.
Figure 5:
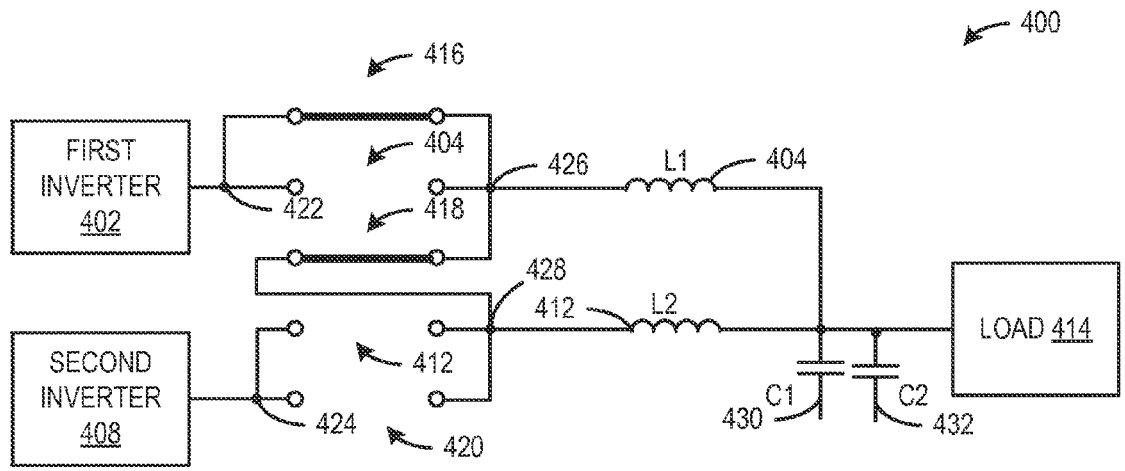
FIG. 5 shows a schematic diagram of the transfer switch circuit of FIG. 4 operating in a second mode where a first inverter provides power through the transfer switch circuit in standalone operation.
Figure 6:
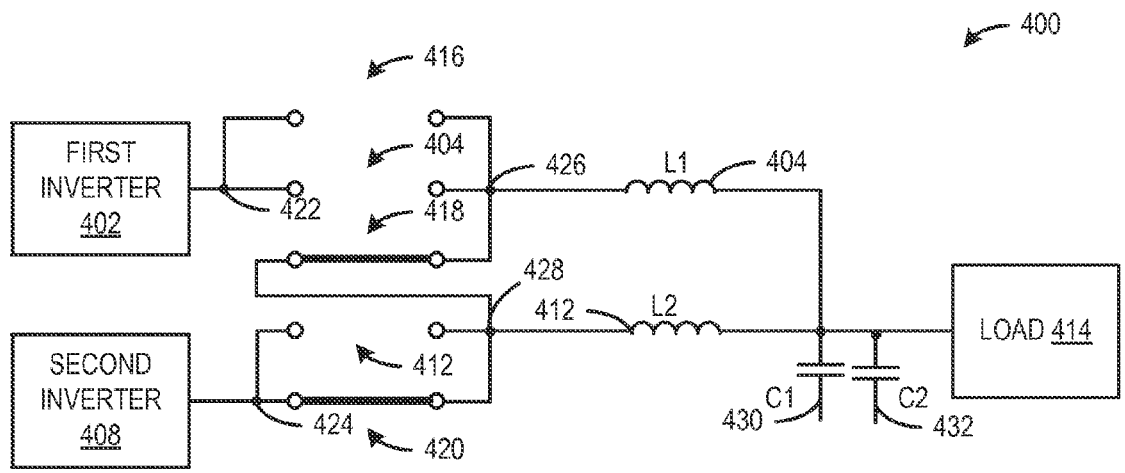
FIG. 6 shows a schematic diagram of the transfer switch circuit of FIG. 4 operating in a third mode where a second inverter provides power through the transfer switch circuit in standalone operation.

FIGS. 4-6 show schematic diagrams of a transfer switch circuit 400 operating in different modes or positions according to an embodiment of the present disclosure. For example, the transfer switch circuit 400 is one non-limiting example of the transfer switch circuit 314 shown in FIG. 3, the transfer switch circuit 214 shown in FIG. 2, or the transfer switch circuit 146 shown in FIG. 1. The transfer switch circuit 400 is configured to share current evenly between inductors in each mode of operation. The transfer switch circuit 400 includes a first input 422 coupled to a first inverter 402 and a second input 424 coupled to a second inverter 408. Further, the transfer switch circuit 400 includes a first output 426 coupled to a load 414 through a first inductor 406 and a second output 428 coupled to the load 414 through a second inductor 412. A first capacitor 430 and a second capacitor 432 are coupled between the first and second inductors 406 and 412 and the load 414. The transfer switch circuit 400 includes a first contact 404, a second contact 410, a third contact 416, a fourth contact 418, and a fifth contact 420 that may be selectively connected between the inputs 422 and 424 and the outputs 426 and 428 depending on a mode of operation of the transfer switch circuit 400. In particular, the first contact 404, the third contact 416, and the fourth contact 418 may be coupled to the first input 422 depending on which mode/position is selected. Further, the second contact 410, the fourth contact 418, and the fifth contact 420 may be coupled to the second input 424 depending on which mode/position is selected.

FIG. 4 shows the transfer switch circuit 400 in a first mode of operation where the first inverter 402 and the second inverter 408 provide power through the transfer switch circuit 400 to the load 414 in parallel. In particular, in the first mode of operation, the first contact 404 is coupled between the first input 422 and the first output 426, which allows power from the first inverter 402 to flow through the first contact 404 and through the first inductor 406 to the load 414. Further, the second contact 410 is coupled between the second input 424 and the second output 428, which allows power from the second inverter 408 to flow through the second contact 410 and through the second inductor 412 to the load 414. Note that the third contact 416, the fourth contact 418, and the fifth contact 420 are not active (i.e., they do not provide power to an output) in the first mode. In the first mode, since both inverters provide power to the load in parallel, the total power received from the power bus is divided between the inverters, and the power is evenly divided between the first and second inductors.

FIG. 5 shows the transfer switch circuit 400 operating in a second mode of operation where the first inverter 402 provides power through the transfer switch circuit 400 to the load 414 in standalone operation. In particular, in the second mode of operation, the third contact 416 is coupled between the first input 422 and the first output 426, which allows power from the first inverter 402 to flow through the third contact 416 and through the first inductor 406 to the load 414. Further, the fourth contact 418 is coupled between the first output 426 and the second output 428, which allows power from the first inverter 402 to flow through the third contact 416, through fourth contact 418 and through the second inductor 412 to the load 414. Note that the first contact 404, the second contact 410, and the fifth contact 420 are not active (i.e., they do not provide power to an output) in the second mode. In the second mode, since only the first inverter provides power to the load, the total power received from the power bus is divided between the first and second inductors.

FIG. 6 shows the transfer switch circuit 400 operating in a third mode of operation where the second inverter 408 provides power through the transfer switch circuit 400 to the load 414 in standalone operation. In particular, in the third mode, the fifth contact 420 is coupled between the second input 424 and the second output 428, which allows power from the second inverter 408 to flow through the fifth contact 420 and through the second inductor 412 to the load 414. Further, the fourth contact 418 is coupled between the second output 428 and the first output 426, which allows power from the second inverter 408 to flow through the fifth contact 420, through the fourth contact 418, and through the first inductor 406 to the load 414. Note that the first contact 404, the second contact 410, and the third contact 416 are not active (i.e., they do not provide power to an output) in the third mode. In the third mode, since only the second inverter provides power to the load, the total power received from the power bus is divided between the first and second inductors.

Figure 11:
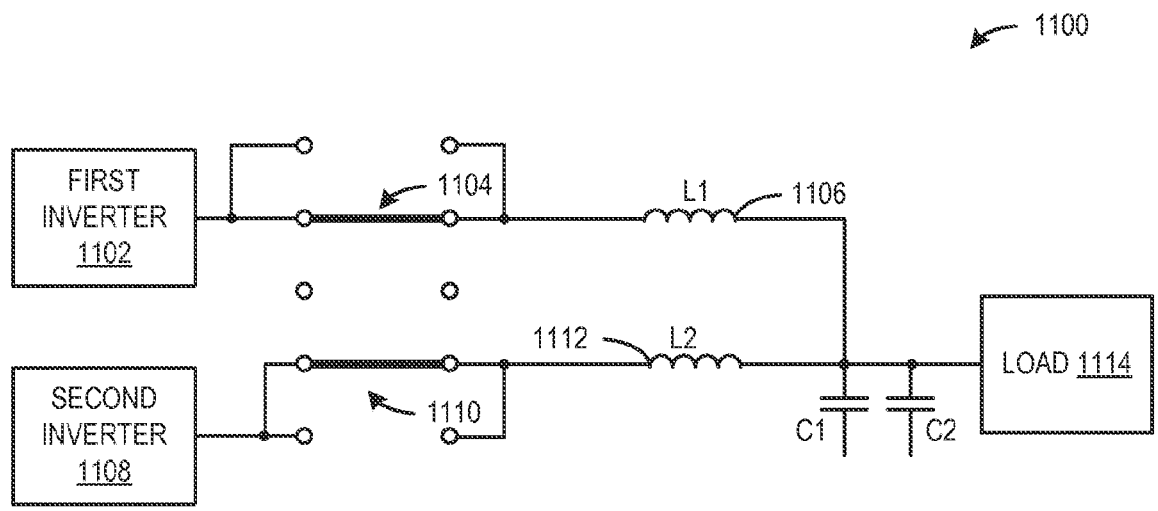
FIGS. 11-12 show schematic diagrams of a PRIOR ART transfer switch circuit.
Figure 12:
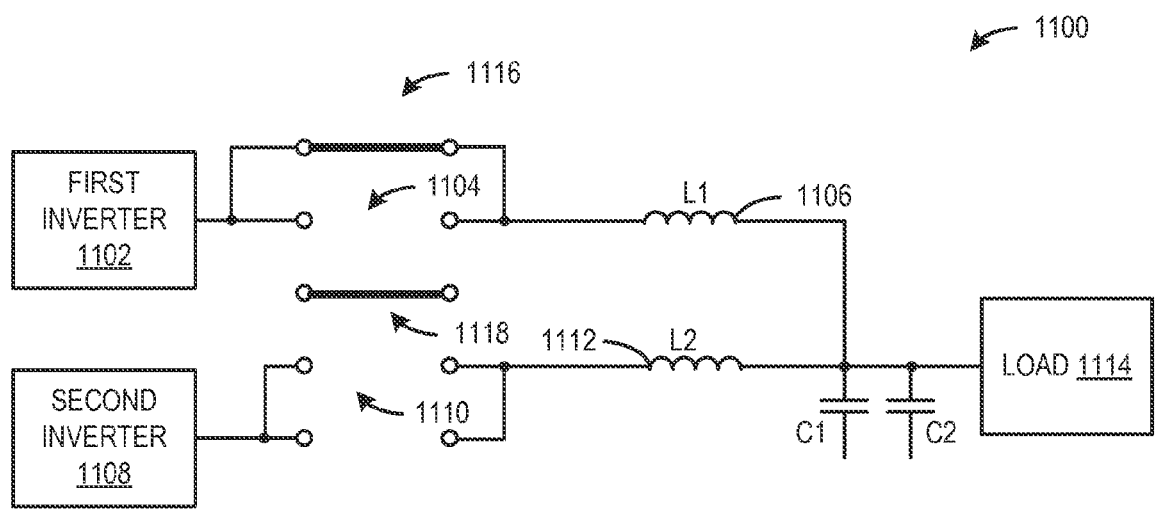

It will be appreciated that the transfer switch circuit provides even current sharing capabilities between the inductors in each of the modes of operation. Accordingly, a power transfer capability of the transfer switch circuit 400 may be increased relative to the transfer switch circuit 1100 of FIGS. 11 and 12 that transfers all power through a single inductor in standalone operation. Further, it will be appreciated that the transfer switch circuit may be implemented using contactors in addition to, or instead of transfer switches without departing from the scope of the present disclosure.

Figure 7:
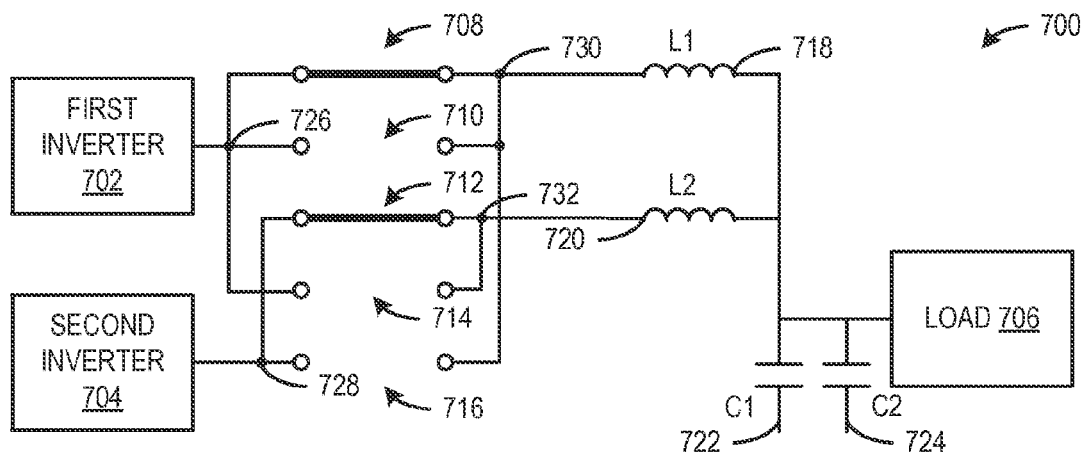
FIG. 7 shows a schematic diagram of another transfer switch circuit operating in a first mode where two inverters provide power through the transfer switch circuit to a load in parallel operation.
Figure 8:
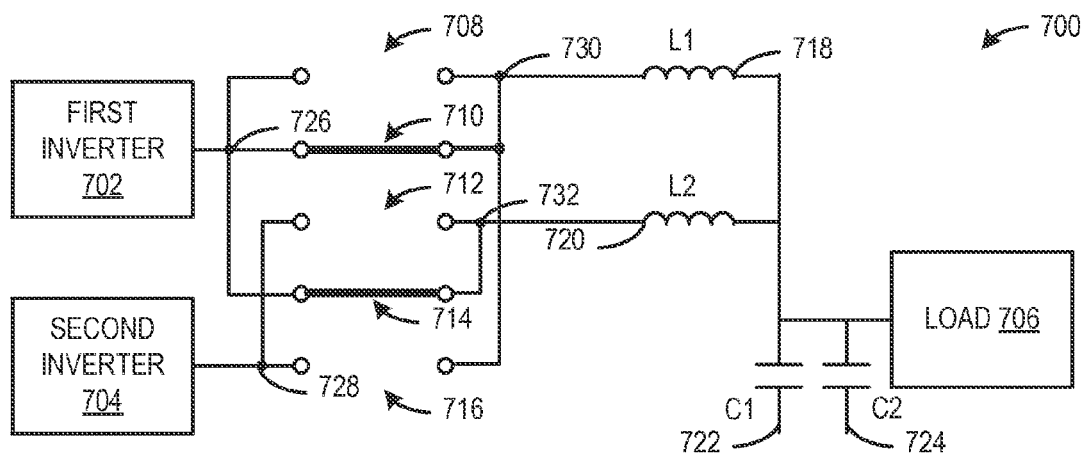
FIG. 8 shows a schematic diagram of the transfer switch circuit of FIG. 6 operating in a second mode where a first inverter provides power through the transfer switch circuit in standalone operation.
Figure 9:
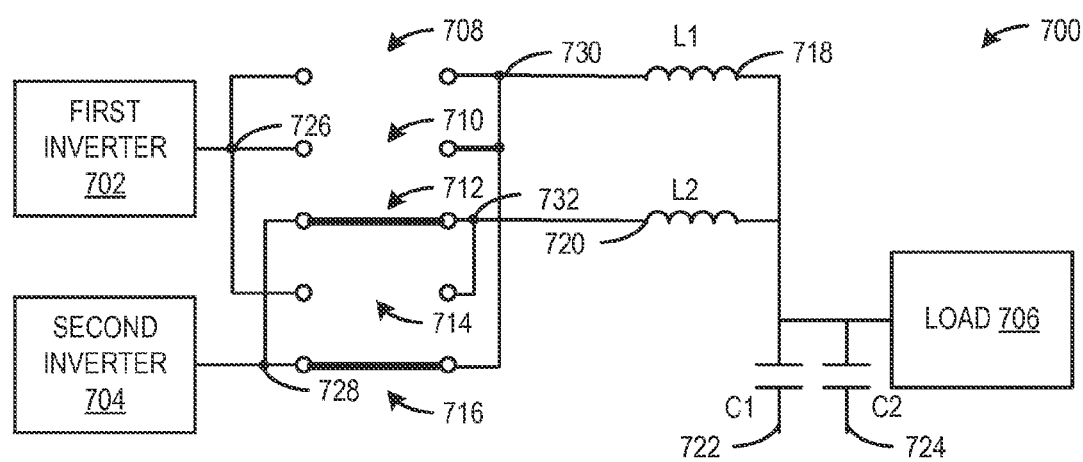
FIG. 9 shows a schematic diagram of the transfer switch circuit of FIG. 6 operating in a third mode where a second inverter provides power through the transfer switch circuit in standalone operation.

FIGS. 7-9 show schematic diagrams of another transfer switch circuit 700 according to an embodiment of the present disclosure operating in different modes or positions. For example, the transfer switch circuit 700 is one non-limiting example of the transfer switch circuit 314 shown in FIG. 3, the transfer switch circuit 214 shown in FIG. 2, or the transfer switch circuit 146 shown in FIG. 1. The transfer switch circuit 700 is configured to share current evenly between active transfer switch contacts and inductors in each mode of operation. The transfer switch circuit 700 includes a first input 726 coupled to a first inverter 702 and a second input 728 coupled to a second inverter 704. Further, the transfer switch circuit 700 includes a first output 730 coupled to a load 706 through a first inductor 718 and a second output 732 coupled to the load 706 through a second inductor 720. A first capacitor 722 and a second capacitor 724 are coupled between the first and second inductors 718 and 720 and the load 706. The transfer switch circuit 700 includes a first contact 708, a second contact 710, a third contact 712, a fourth contact 714, and a fifth contact 716 that may be selectively connected between the inputs 726 and 728 and the outputs 730 and 732 depending on a mode of operation of the transfer switch circuit 700. In particular, the first contact 708, the second contact 710, and the fourth contact 714 may be coupled to the first input 726 depending on which mode/position is selected. Further, the third contact 712, the fourth contact 714, and the fifth contact 716 may be coupled to the second input 728 depending on which mode/position is selected.

FIG. 7 shows the transfer switch circuit 700 in a first mode of operation where the first inverter 702 and the second inverter 704 provide power through the transfer switch circuit 700 to the load 706 in parallel. In particular, in the first mode, the first contact 708 is coupled between the first input 726 and the first output 730, which allows power from the first inverter 702 to flow through the first contact 708 and through the first inductor 718 to the load 706. Further, the third contact 712 is coupled between the second input 728 and the second output 732, which allows power from the second inverter 704 to flow through the third contact 712 and through the second inductor 720 to the load 706. Note that the second contact 710, the fourth contact 714, and the fifth contact 716 are not active (i.e., they do not provide power to an output) in the first mode. In the first mode of operation, since both inverters provide power to the load in parallel, the total power received from the power bus is divided between the inverters, and the power is evenly divided between the active contacts (i.e., the first contact and the third contact) of the transfer switch circuit 700. Correspondingly, each active contact carries the current of one inductor. In particular, the first contact 708 carries the current of the first inductor 718 and the third contact 712 carries the current of the second inductor 720.

FIG. 8 shows the transfer switch circuit 700 operating in a second mode of operation where the first inverter 702 provides power through the transfer switch circuit 700 to the load 706 in standalone operation. In particular, in the second mode, the second contact 710 is coupled between the first input 726 and the first output 730, which allows power from the first inverter 702 to flow through the second contact 710 and through the first inductor 718 to the load 706. Further, the fourth contact 714 is coupled between the first input 726 and the second output 732, which allows power from the first inverter 702 to flow through the fourth contact 714 and through the second inductor 720 to the load 706. Note that the first contact 708, the third contact 712, and the fifth contact 716 are not active (i.e., they do not provide power to an output) in the second mode of operation. In the second mode of operation, since only the first inverter provides power to the load, the total power received from the power bus is provided by the first inverter, and the power is evenly divided between the active contacts (i.e., the second contact and the fourth contact) of the transfer switch circuit 700. Correspondingly, each active contact carries the current of one inductor. In particular, the second contact 710 carries the current of the first inductor 718 and the fourth contact 714 carries the current of the second inductor 720.

FIG. 9 shows the transfer switch circuit 700 operating in a third mode where the second inverter 704 provides power through the transfer switch circuit 700 to the load 706 in standalone operation. In particular, in the third mode, the third contact 712 is coupled between the second input 728 and the first output 730, which allows power from the second inverter 704 to flow through the third contact 712 and through the first inductor 718 to the load 706. Further, the fifth contact 716 is coupled between the second input 728 and the second output 732, which allows power from the second inverter 704 to flow through the fifth contact 716 and through the second inductor 720 to the load 706. Note that the first contact 708, the second contact 710, and the fourth contact 714 are not active (i.e., they do not connect an input to an output) in the third mode. In the third mode of operation, since only the second inverter provides power to the load, the total power received from the power bus is provided by the second inverter, and the power is evenly divided between the active contacts (i.e., the third contact and the fifth contact) of the transfer switch circuit 700. Correspondingly, each active contact carries the current of one inductor. In particular, the third contact 712 carries the current of the first inductor 718 and the fifth contact 716 carries the current of the second inductor 720.

The transfer switch circuit 700 provides even current sharing among active contacts in each of the three modes of operation. Correspondingly, in each mode, each active contact carries one inductor current. By evenly dividing power between active contacts in each mode of operation, a power capability of the transfer switch circuit may be increased relative to a circuit where all power input to the circuit flows through a single contact (e.g., transfer switch circuit 400 of FIGS. 4-6 and transfer switch circuit 1100 of FIGS. 11 and 12) instead of being evenly divided between active contacts.

In some embodiments, the inductors and capacitors that filter the power output from the transfer switch circuit may be positioned between the inverters and the inputs of the transfer switch circuit without departing from the scope of the present disclosure. Further, it will be appreciated that the transfer switch circuit may be implemented using contactors in addition to, or instead of transfer switches without departing from the scope of the present disclosure.

Figure 10:
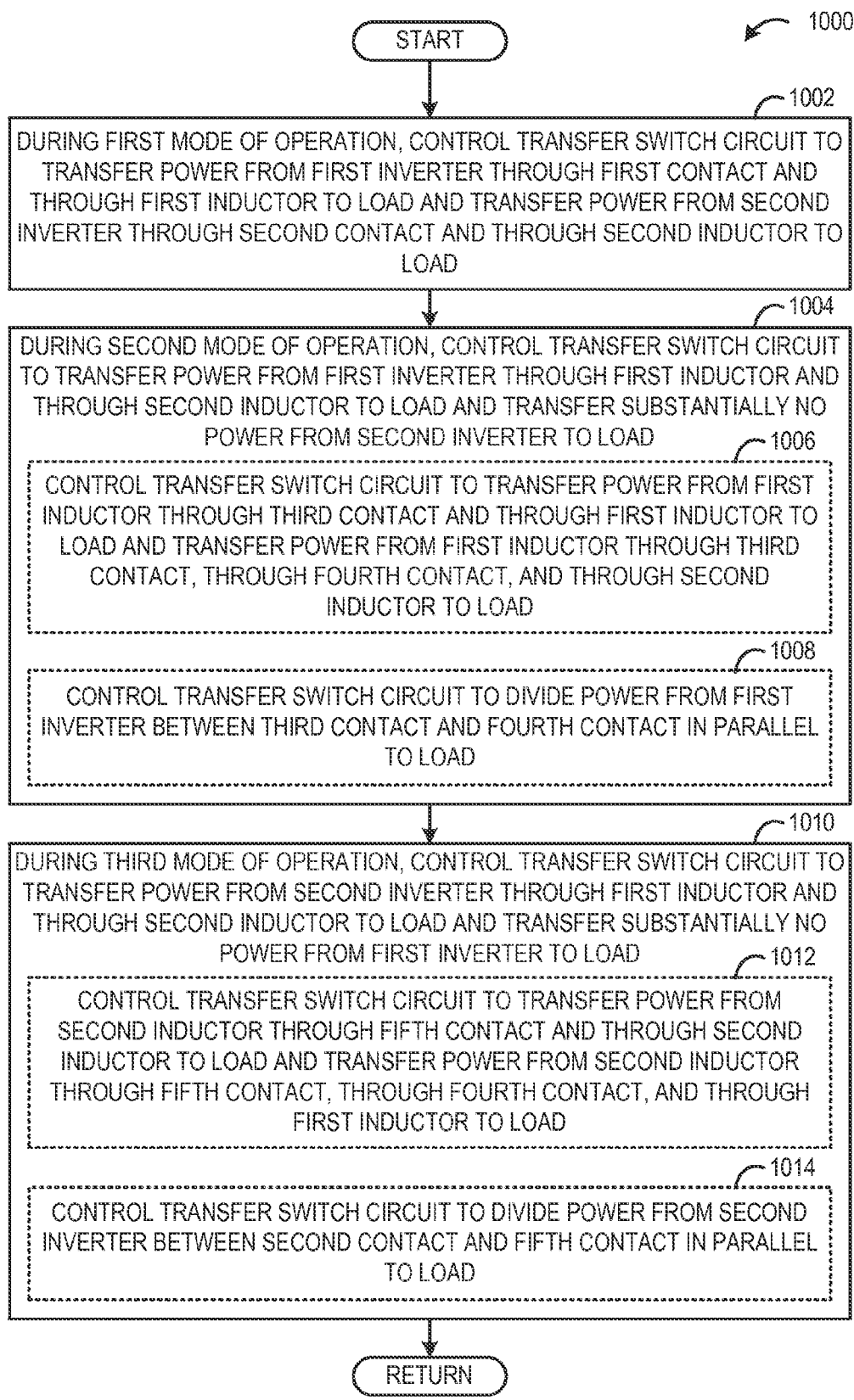
FIG. 10 shows a flow chart of an example method for controlling a transfer switch circuit.

FIG. 10 shows a flow chart of an example method 1000 for controlling a transfer switch circuit. In one example, the method 1000 is executed by the controller 126 in FIG. 1. At 1002, the method 1000 includes, during a first mode of operation, controlling a transfer switch circuit to transfer power from a first inverter through a first contact of a transfer switch circuit and through a first inductor to a load, and transfer power from a second inverter through a second contact of the transfer switch circuit and through a second inductor to the load. In the first mode of operation, power from both of the first and second inverters is provided in parallel to the load. The current of the inverters is shared evenly between each of the first and second inductors.

At 1004, the method 1000 includes, during a second mode of operation, controlling the transfer switch circuit to transfer power from the first inverter through the first inductor and the second inductor to the load, and transfer substantially no power (e.g., less than 10% of a current output by the second inverter) from the second inverter to the load. In the second mode of operation, power from the first inverter is provided to the load and the current of the first inverter is shared evenly between each of the first and second inductors.

In some embodiments, at 1006, the method 1000 includes controlling the transfer switch circuit to transfer power from the first inductor through a third contact and through the first inductor to the load, and transfer power from the first inductor through the third contact, through a fourth contact, and through the second inductor to the load in the second mode of operation. In one example, such a step is performed when controlling the transfer switch circuit 400 shown in FIGS. 4-6 to share current evenly between the inductors.

In some embodiments, at 1008, the method 1000 includes controlling the transfer switch circuit to divide power from the first inverter between a third contact and a fourth contact in parallel to the load. In one example, such a step is performed when controlling the transfer switch circuit 700 shown in FIGS. 7-9 to share current evenly between the active contacts and to share current evenly between the inductors.

At 1010, the method 1000 includes, during a third mode of operation, controlling the transfer switch circuit to transfer power from the second inverter through the first inductor and the second inductor to the load, and transfer substantially no power from the first inverter to the load (e.g., less than 10% of a current output by the first inverter).

In some embodiments, at 1012, the method 1000 includes controlling the transfer switch circuit to transfer power from the second inductor through a fifth contact and through the second inductor to the load, and transfer power from the second inductor through the fifth contact, through the fourth contact, and through the first inductor to the load in the third mode of operation. In one example, such a step is performed when controlling the transfer switch circuit 400 shown in FIGS. 4-6 to share current evenly between the inductors.

In some embodiments, at 1014, the method 1000 includes controlling the transfer switch circuit to divide power from the second inverter between the second contact and a fifth contact in parallel to the load. In one example, such a step is performed when controlling the transfer switch circuit 700 shown in FIGS. 7-9 to share current evenly between the active contacts and to share current evenly between the inductors.

By evenly sharing power among inductors and/or active contacts of the transfer switch circuit during each mode of operation, the power capacity of the circuit may be increased relative to a transfer switch circuit that directs all power through a single contact or a single inductor, under some conditions.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third,"

etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a first inverter coupled to an electrical bus;
 a second inverter coupled to the electrical bus;
 a filter including a first inductor and a second inductor;
 a transfer switch circuit coupled between the first inverter and the second inverter and a load; and
 a controller having instructions to control the transfer switch circuit to transfer power from the first inverter through the first inductor to the load and transfer power from the second inverter through the second inductor to the load in a first mode of operation, and to transfer power from the first inverter through the first inductor and through the second inductor to the load in a second mode of operation.

2. The system of claim 1, wherein the transfer switch circuit is further configured to transfer power from the second inverter through the first inductor and through the second inductor to the load in a third mode of operation.

3. The system of claim 2, wherein the transfer switch circuit is configured to transfer substantially no power from the first inverter to the load in the third mode of operation.

4. The system of claim 2, wherein the transfer switch circuit comprises a first contact, a second contact, a third contact, a fourth contact, and a fifth contact, and the controller further includes instructions to control the transfer switch circuit to:
 transfer power from the first inverter through the third contact and through the first inductor to the load, and transfer power from the first inverter through the third contact, through the fourth contact, and through the second inductor to the load in the second mode of operation, and
 transfer power from the second inverter through the fifth contact and through the second inductor to the load, and transfer power from the second inverter through the fifth contact, through the fourth contact, and through the first inductor to the load in the third mode of operation.

5. The system of claim 1, wherein the transfer switch circuit comprises a first contact, a second contact, a third contact, and a fourth contact, the controller further having instructions to control the transfer switch circuit to:
 transfer power from the first inverter through the first contact and through the first inductor to the load, and transfer power from the second inverter through the second contact and through the second inductor to the load in the first mode of operation, and
 transfer power from the first inverter through the third contact and through the first inductor to the load, and transfer power from the first inverter through the third contact, through the fourth contact, and through the second inductor to the load in the second mode of operation.

6. The system of claim 1, wherein the filter is coupled between the first and second inverters and the transfer switch circuit.

7. The system of claim 1, wherein the filter is coupled between the transfer switch circuit and the load.

8. The system of claim 1, wherein the transfer switch circuit is configured to transfer substantially no power from the second inverter to the load in the second mode of operation, wherein the electrical bus is coupled to an alternator, and wherein the controller has instructions to switch from the first mode of operation to the second mode of operation based on an output of the alternator.

9. A system, comprising:
 a first inverter coupled to an electrical bus;
 a second inverter coupled to the electrical bus; and
 a transfer switch circuit coupled to the first inverter, the second inverter, and a load, the transfer switch circuit being configured to transfer power from the first inverter through a first contact to the load and transfer power from the second inverter through a second contact to the load in a first mode of operation, the transfer switch circuit further being configured to divide power from the first inverter between a third contact and a fourth contact in parallel to the load in a second mode of operation.

10. The system of claim 9, wherein the transfer switch circuit is configured to transfer substantially no power from the second inverter to the load in the second mode of operation.

11. The system of claim 9, wherein the transfer switch circuit is configured to divide power from the second inverter between the second contact and a fifth contact in parallel to the load in a third mode of operation.

12. The system of claim 11, wherein the transfer switch circuit is configured to transfer substantially no power from the first inverter to the load in the third mode of operation.

13. The system of claim 11, further comprising:
 a filter including a first inductor and a second inductor, and wherein the transfer switch circuit is configured to transfer power from the first inverter through the first contact and through the first inductor to the load and transfer power from the second inverter through the second contact and through the second inductor to the load in the first mode of operation.

14. The system of claim 13, wherein the transfer switch circuit is configured to transfer power from the first inverter through the third contact and through the first inductor to the load and transfer power from the first inverter through the fourth contact and through the second inductor to the load in the second mode of operation.

15. The system of claim 13, wherein the transfer switch circuit is configured to transfer power from the second inverter through the second contact and through the second inductor to the load and transfer power from the second inverter through the fifth contact and through the first inductor to the load in the third mode of operation.

16. The system of claim 13, wherein the filter is coupled between the first and second inverters and the transfer switch circuit.

17. The system of claim 13, wherein the filter is coupled between the transfer switch circuit and the load.

18. A method, comprising:
 controlling a transfer switch circuit, in a first mode of operation, to transfer power from a first inverter through a first inductor to a load and transfer power from a second inverter through a second inductor to the load; and controlling the transfer switch circuit, in a second mode of operation, to transfer power from the first inverter through the first inductor and through the second inductor to the load.

19. The method of claim 18, further comprising:

controlling the transfer switch circuit, in a third mode of operation, to transfer power from the second inverter through the first inductor and through the second inductor to the load.

20. The method of claim 19 further comprising, controlling the transfer switch circuit, in the first mode of operation, to transfer power from the first inverter through a first contact of the transfer switch circuit and through the first inductor to the load and transfer power from the second inverter through a second contact of the transfer switch circuit and through the second inductor to the load;

controlling the transfer switch circuit, in the second mode of operation, to transfer power from the first inductor through a third contact and through the first inductor to the load and transferring power from the first inductor through the third contact, through a fourth contact, and through the second inductor to the load, and transfer substantially no power from the second inverter to the load; and controlling the transfer switch circuit, in the third mode of operation, to transfer power from the second inductor through a fifth contact and through the second inductor to the load, transfer power from the second inductor through the fifth contact, through the fourth contact, and through the first inductor to the load, and transfer substantially no power from the first inverter to the load during the third mode of operation.

* * * * *